Dec. 30, 1924.

A. HENROZ 1,521,097

APPARATUS FOR THE AUTOMATIC MANUFACTURE OF TILES WITH INCRUSTED DESIGNS

Filed April 16, 1923   7 Sheets-Sheet 1

Inventor:
Arthur Henroz
By [signature]
Attorney.

Dec. 30, 1924.　　　　　　　　　　　　　　　1,521,097
A. HENROZ
APPARATUS FOR THE AUTOMATIC MANUFACTURE OF TILES WITH INCRUSTED DESIGNS
Filed April 16, 1923　　　7 Sheets-Sheet 2
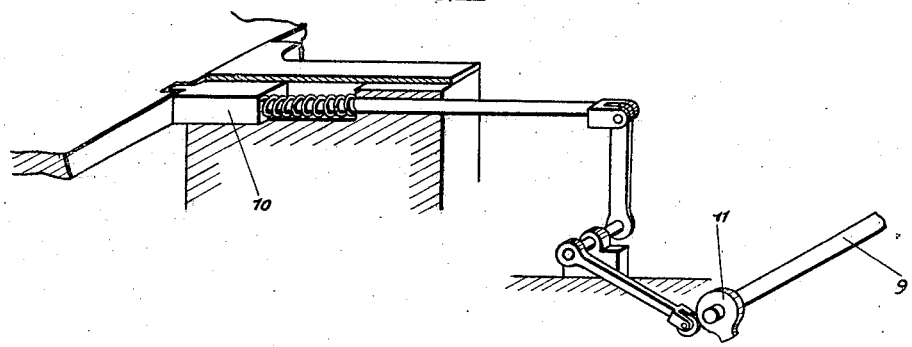
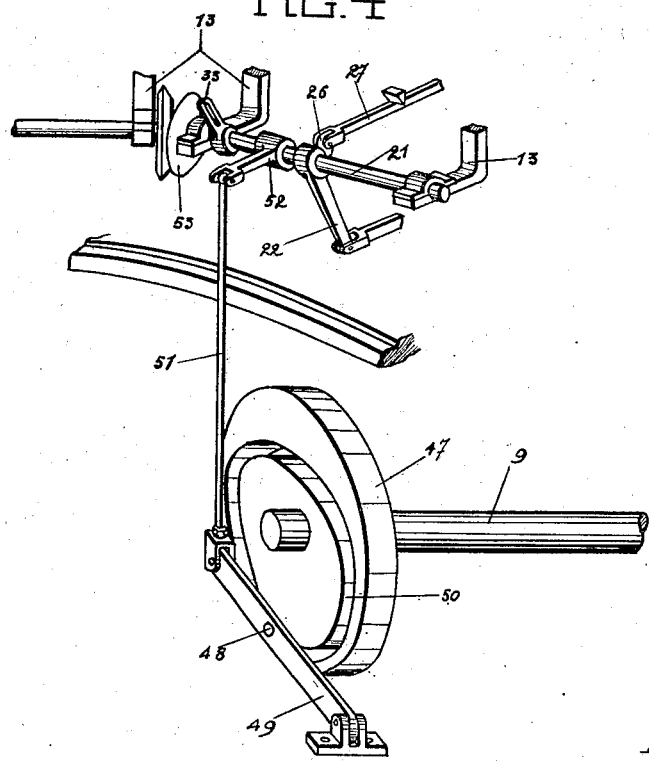
Inventor:
Arthur Henroz
By
Attorney Dec. 30, 1924.

A. HENROZ 1,521,097

APPARATUS FOR THE AUTOMATIC MANUFACTURE OF TILES WITH INCRUSTED DESIGNS

Filed April 16, 1923    7 Sheets-Sheet 3

Inventor:
Arthur Henroz
By
Attorney

Dec. 30, 1924.

A. HENROZ 1,521,097

APPARATUS FOR THE AUTOMATIC MANUFACTURE OF TILES WITH INCRUSTED DESIGNS

Filed April 16, 1923   7 Sheets-Sheet 4

Inventor:
Arthur Henroz
By [signature]
Attorney

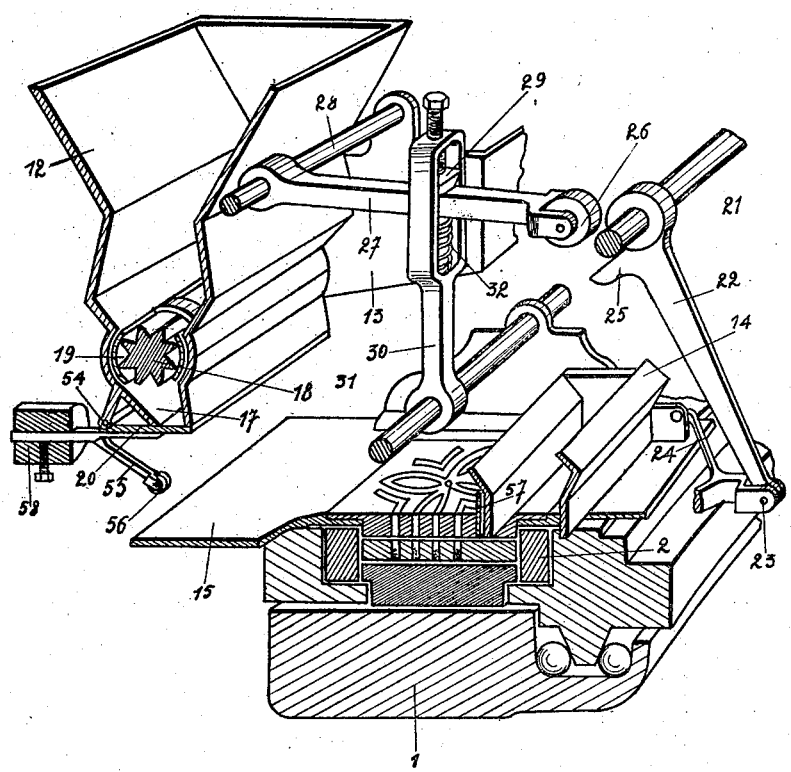

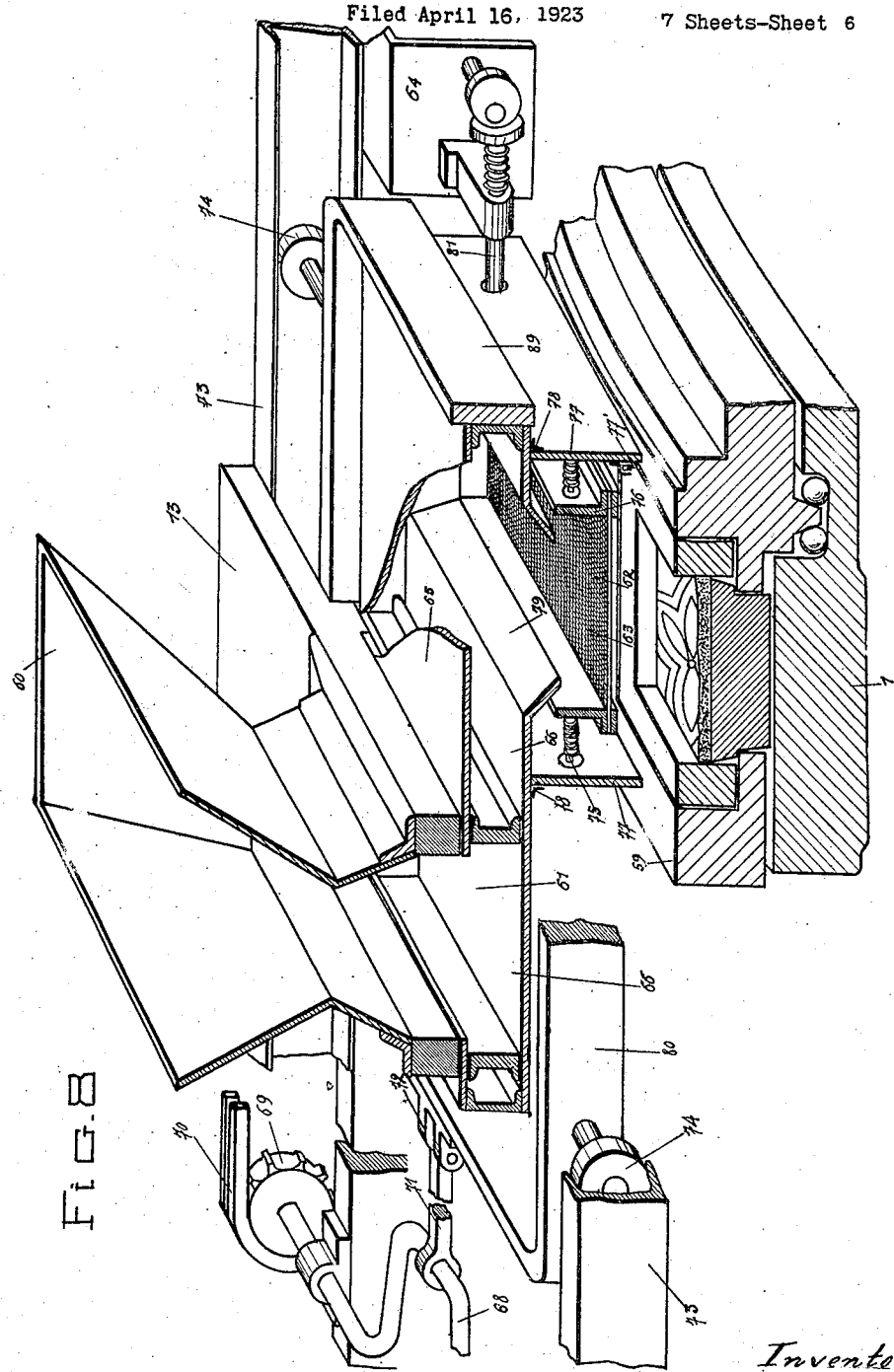

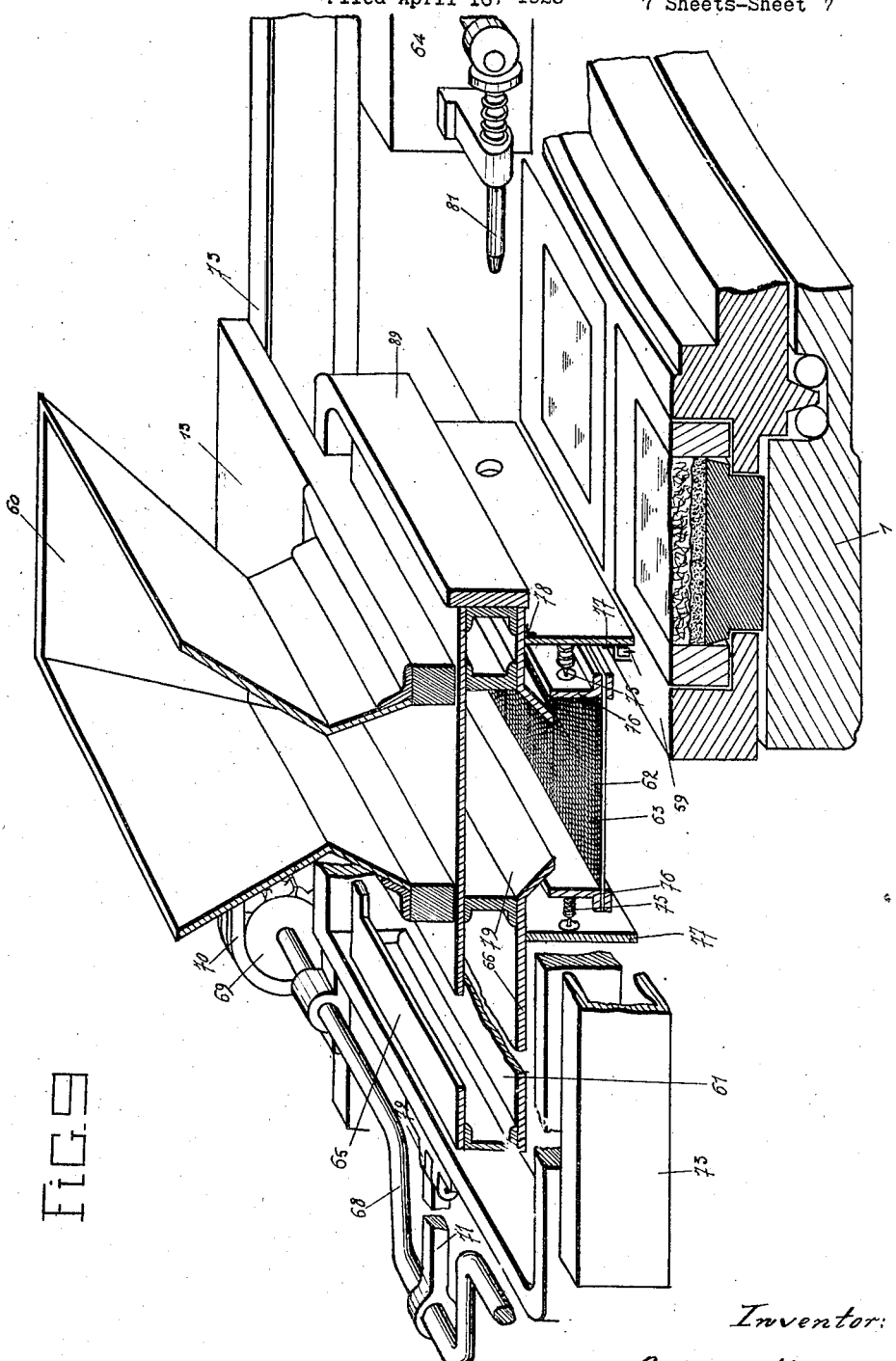

Patented Dec. 30, 1924.

1,521,097

UNITED STATES PATENT OFFICE.

ARTHUR HENROZ, OF BRUSSELS, BELGIUM.

APPARATUS FOR THE AUTOMATIC MANUFACTURE OF TILES WITH INCRUSTED DESIGNS.

Application filed April 16, 1923. Serial No. 632,463.

*To all whom it may concern:*

Be it known that I, ARTHUR HENROZ, a citizen of the Kingdom of Belgium, and resident of Brussels, Belgium, have invented certain new and useful Improvements in Apparatus for the Automatic Manufacture of Tiles with Incrusted Designs; and I do hereby declare the following to be a full, clear, and exact description of the invention, such as will enable others skilled in the art to which it appertains to make and use the same, reference being had to the accompanying drawings, and to letters or figures of reference marked therein, which form a part of this application.

This invention relates to an apparatus for the manufacture of tiles with incrusted designs in which the tile during manufacture is carried on a movable table having an intermittent motion which successively moves the tile into the neighbourhood of mechanisms suitable for each of the known operations necessary for its manufacture.

The present invention specially relates to apparatus in which there is used a colour distributing mechanism for each different colour.

In apparatus of this kind, the mixing of the difficult colours comprising the design is prevented during manufacture by forming the pattern member or stencil with partitions. The stencil is divided into different compartments by thin vertical partition walls which follow all the outlines of the design.

In order to effect the introduction of each colour into the corresponding parts of the stencil a counter-pattern is used. This is constituted by a plate which is arranged above the stencil and is perforated with openings of suitable dimensions to allow the colour discharged from the distributing mechanism to pass, but only in certain places, the other parts of the stencil being stopped by the said plate.

After the different colours have been introduced and when the stencil has been removed, the manufacture of the tile is completed by adding the material in a pulverulent state which constitutes the aggregate.

The present invention particularly relates to special arrangements given to the mechanism for the distribution of the colours and of the aggregate.

These distributing mechanisms are constituted by funnels comprising:

1, a fixed hopper in which the material is stored, 2, a mechanism for delivering a measured quantity of the material and emptying the same into a receiver, 3, the receiver itself which leads the material to the mould for the tile being manufactured.

The lower edges of the said movable receiver slide during its course on the upper face of the counter-pattern in such a way as to cause the material which has not already fallen into the moulds, to penetrate through the holes.

*Mechanism for distributing the colour.—*
The above mentioned receiver slides on a plate having an opening in which is located the counter-pattern; the plate and the countery-pattern are raised when the colour has been emptied into the correspondig compartments of the stencil, in order to permit the table to turn by the amount necessary in order to bring the stencil under the following colour distributor.

It will then be necessary to effect the three following operations for each colour distributor:—

(*a*) The to-and-fro movement of the receiver containing a predetermined quantity of material.

(*b*) The movement of rising and falling of the counter-pattern and of the receiver.

(*c*) The movement of the mechanism for delivering a measured quantity of the colour.

This mechanism comprises an element for delivering the measured quantity, which element has an intermittent rotary movement.

These three operations are effected for each distributor by means of a single shaft having a rotary reciprocatory movement. The actuating shafts of the different mechanisms for the distribution of colour are arranged to form a polygon and are interconnected. Movement is communicated to one of them by the medium of a cam mounted on the principal shaft of the apparatus.

*Mechanism for distributing the aggregate.*—In this mechanism the bottom of the movable receiver is constituted by a screen through which said aggregate passes when shaking is imparted to it. It is only subjected to shaking when it is above the mould.

The delivery of the measured quantity of the aggregate at each passage of the receiver under the hopper, is effected by the following arrangement:

A chamber of predetermined capacity situated below the hopper is alternatively put into communication with the hopper which feeds it and with the receiver into which it empties its contents. With this object in view, a system of valves is used comprising two steel plates, of which the one constitutes the bottom of the chamber intended for the delivery of a measured quantity of the aggregate when the receiver is placed above the mould, and of which the other constitutes the bottom of the hopper when the receiver is placed below the chamber for the delivery of a measured quantity of the aggregate. The desired movements are communicated to this system of valves by connecting them with the receiver.

The frame enclosing the receiver screen is provided with a small scraper which removes any excess of the aggregate.

It is self-evident that the invention is applicable to all types of tables for the automatic manufacture of tiles with incrusted designs The accompanying drawings represent a form of construction of the invention in the case of a machine with a circular table.

Figure 3 is a perspective view of the mechanism for locking the circular table.

Figure 4 is a perspective view of the mechanism which effects the intermittent movement of the mechanisms for distributing the colours.

Figure 7 is a perspective view analogous to Figure 6, the receiver being withdrawn from the hopper and being stationed at the end of its course.

Figure 8 is a perspective view of the mechanism for distributing the aggregate, the receiver being placed above the mould.

Figure 9 is a view analogous to Figure 8, the receiver being placed below the hopper.

Figure 1:
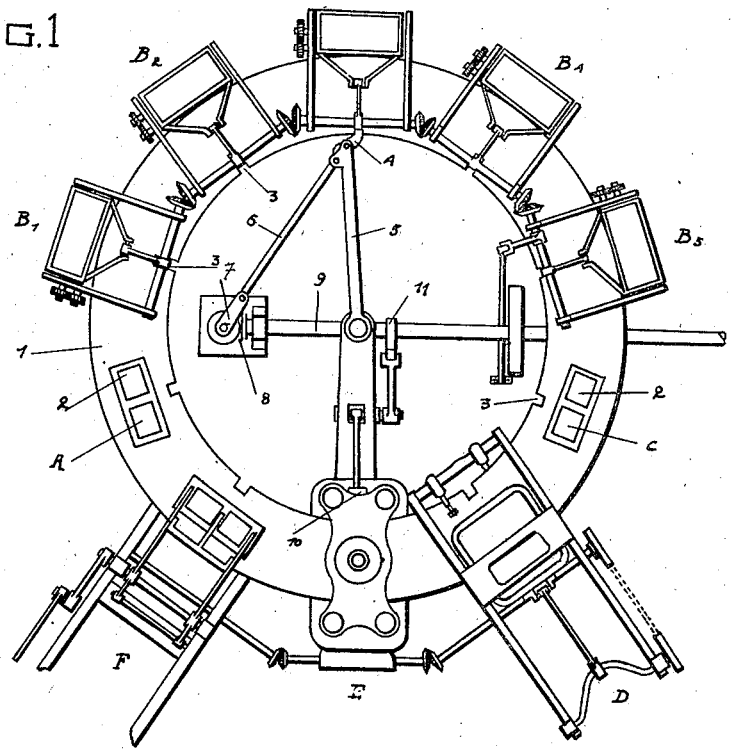
Figure 1 represents a plan view of the whole apparatus showing the general arrangement of the different mechanisms according to the invention.
Figure 2:
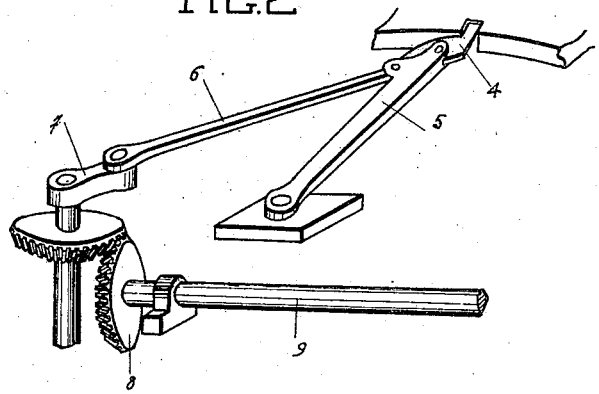
Figure 2 is a perspective view of the mechanism giving an intermittent movement to the circular table.

The circular table (Fig. 1) has an intermittent rotary movement which successively leads the moulds 2 in front of the various mechanisms where are effected the different operations necessary for the manufacture of the tile. These operations comprise; the arrangement of the stencils or patterns in the moulds by a workman stationed at A in Fig. 1, the successive distribution of the different colours at $B_1$ to $B_5$, the removal of the stencils by a workman situated at C, the introduction of the material constituting the aggregate of a tile at D, and the pressing at E, the removal from the mould and the withdrawal of the finished tile at F.

An annular plate 1 forms the body of the table and is composed of segments in each of which is inserted a frame constituting a double mould. The plate 1 turning on ball-bearings is provided on its inner edge with notches 3 (Fig. 1) in one of which penetrates periodically a pawl 4 carried by a lever 5. The lever 5 is connected by a rod 6 to a crank 7 operated through the intermediary of a bevel gear 8 by the driving shaft 9 and produces the intermittent advancement of the table 1. A pawl 10 (Fig. 3) actuated by a cam 11 mounted on the driving shaft 9 locks the table at the moment when one of the moulds, after a certain angular displacement, comes to be situated under one of the mechanisms where the operations are carried out.

Referring more particularly to the colour distributing system, there is provided a special mechanism for each colour used; these different mechanisms $B_1$ to $B_5$ being similar in construction and operation, it will be sufficient to describe one only.

Figure 5:
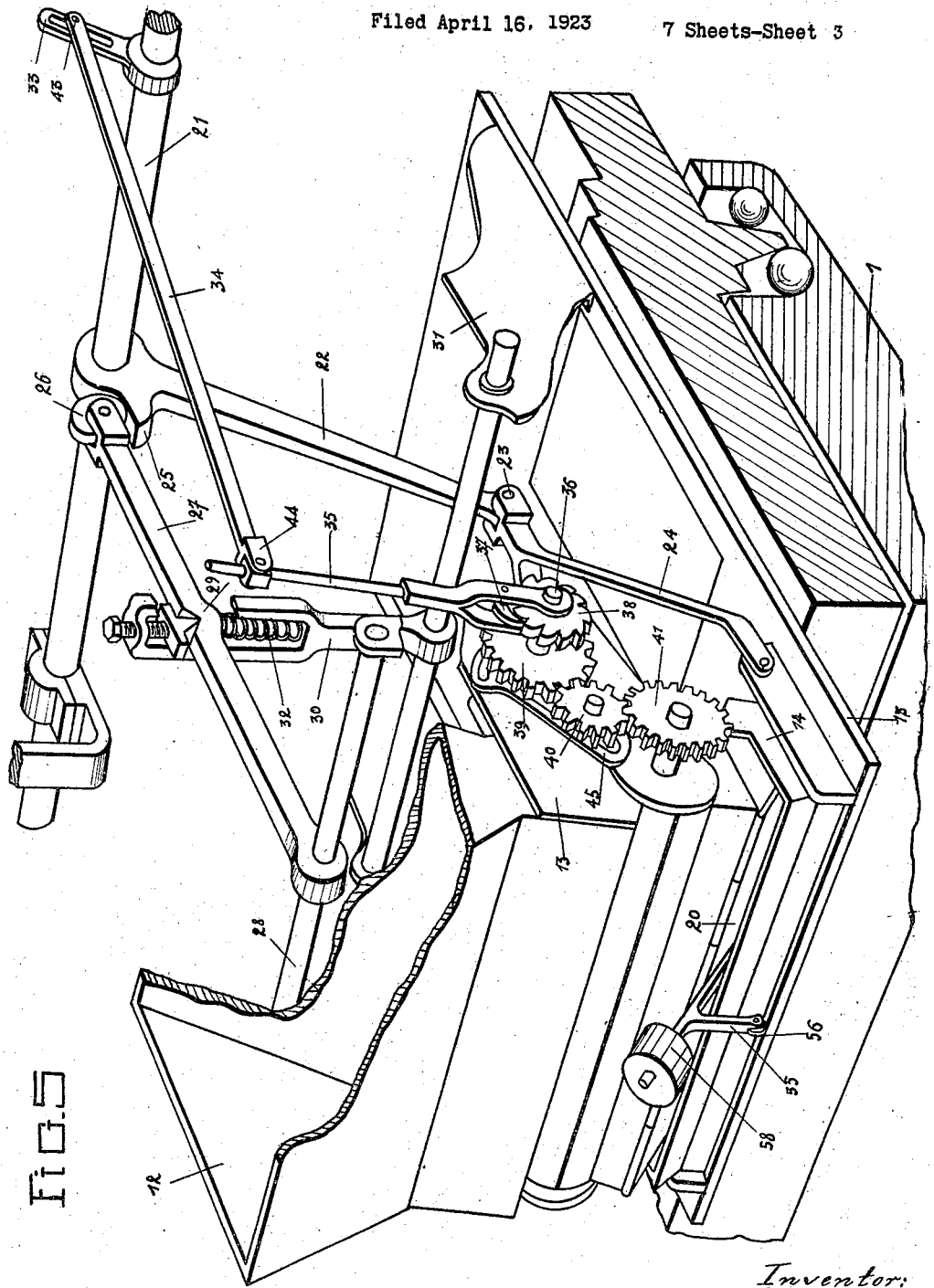
Figure 5 is a general view showing in perspective the mechanism for actuating the colour distributing mechanism.
Figure 6:
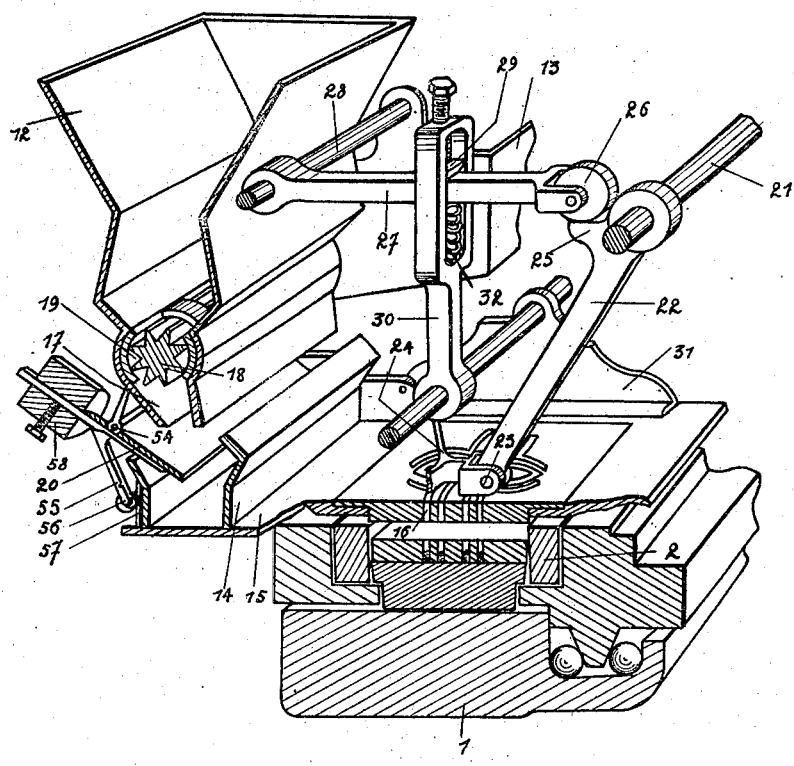
Figure 6 is a perspective view of the colour distributing mechanism, the receiver operating to transport the colour from the distributor towards the mould being placed below the hopper.

The supply of colour is contained in the hopper 12 fixed to the framing 13 of the machine (Fig. 5). The quantity necessary for the manufacture of each pair of tiles is emptied periodically through the medium of a mechanism for delivering a measured quantity, situated at the lower part of this hopper, into a movable receiver 14 which discharges it above the mould 2. The bottom of the receiver is constituted by a plate 15 on which said receiver is displaced.

In the part of this plate situated above the place where the various moulds are successively located, there is provided an opening in which is situated the counter-pattern 16 whose perforations correspond to the part of the design which should have the colour concerned. It is advantageous to use a counter-pattern of the type forming the subject of my co-pending application No. 632,462, filed April 16, 1923.

When the receiver 14 passes above the counter-pattern 16, the colour which it contains runs through the latter into the corresponding divisions of the stencil. On account of the fact that the receiver 14 slides on the upper face of the counter-pattern it causes the material which has not already fallen therethrough, to penetrate into the mould.

During the operations the said counter-pattern descends into the inside of the mould. It is afterwards withdrawn therefrom in order to permit the advance of the table.

The movement of raising and lowering of the counter-pattern 16 is effected by imparting to the plate 15 in which it is located, alternately up-and-down displacements.

It is self-evident that the receiver 14 follows these vertical displacements.

Referring to the mechanism for supplying a measured quantity hereinbefore mentioned, this comprises below the hopper 12 a chamber 17 which is separated from it by a drum 18, in which are provided grooves 19. A rotation of a predetermined amplitude is given to this drum and assures the discharge into this chamber of a predetermined quantity of colour. This chamber 17 is closed at its lower part by a movable cover 20 which is open when the movable receiver 14 is below the said chamber. With this object in view, this cover is pivoted at 54 and is provided with an arm 55 having a roller 56 which is struck by the wall 57 of the receiver 14 when it comes close to the chamber 17.

At this moment the colour which the drum 18 has allowed to pass into the chamber is emptied into the said receiver. When the receiver is withdrawn from the said chamber 17 a counterweight 58 leads back the cover into its closed position.

It is therefore necessary to effect in the said distributing mechanism, the following movements:

(1) a to-and-fro movement of the receiver 14,
(2) a raising and lowering movement of the plate 15,
(3) an intermittent rotary movement of the drum 18 for delivering the measured quantities.

These three movements are obtained by means of a shaft 21 having an oscillating motion (Fig. 5).

On this shaft is keyed an arm 22 connected by a pin 23 to the yoke 24 fixed to the receiver 14.

This arm 22 is provided with a cam 25 which can act through the intermediary of a roller 26 on a lever 27 pivoted to a rod 28, from which lever is suspended at 29 a frame 30 which carries the plate 15 by means of brackets 31. A regulating screw allows of determining the height to which the counter-pattern will be raised.

With the object of cushioning the shocks resulting from the displacement of these members, springs 32 are interposed between the said lever 27 and the frame 30.

On the shaft 21 is also keyed an arm 33 connected by means of a small connecting rod 34 to a forked rod 35 loosely mounted on a spindle 36 and carrying a pawl 37 acting on a ratchet wheel 38. This latter transmits its movement to the drum 18 by toothed wheels 39, 40 and 41.

With the object of regulating the flow of the colouring material, the gears 39, 40 and 41 which actuate the drum 18 are given different dimensions, and the stroke of the actuating pawl may be varied in its extent.

The different mechanisms for the distribution of colour are placed side by side around the table 1. The shafts 21 are interconnected by means of bevel gears 53 (Fig. 4). One of these shafts, that belonging to the mechanism $B_5$, is operated by means of a cam 47 keyed on the driving shaft 9. With this object the stud 48 fixed on a lever 49 slides in the groove 50 of the said cam which is arranged in such a way as to allow this stud to maintain its level constant during all the time that the table is moving, and on the contrary to have a to-and-fro vertical movement at the time when the table is stationary. The movement of the lever 49 is transmitted to the shaft 21 through the intermediary of the rod 51 pivoted to the arm 52 which is keyed on the said shaft.

The mechanism for the distribution of the aggregate placed at the spot D in Figure 1, acts, after the pattern has been removed, to fill the mould at the bottom of which are located the coloured materials.

The supply of aggregate is contained in a hopper 60 fixed to the framework 13 of the machine (Fig. 8). The quantity necessary for the manufacture of each pair of tiles is poured out periodically, through the medium of a measuring chamber 61, into a receiver 63, which carries the aggregate above the mould 2. When the receiver 63 comes above the mould, the aggregate which it contains falls through the meshes of the screen 62 under the effect of the shaking which is imparted to it through suitable means.

Referring to the measuring chamber 61, this is alternatively put into communication with the hopper 60 and the receiver, by means of a valve system, comprising two steel plates 65 and 66, of which one constitutes the bottom of the chamber 61 when the receiver 63 is placed above the mould (Fig. 8), and of which the other constitutes the bottom of the hopper 60 when the receiver 63 is placed below the chamber 61 (Fig. 9).

The valve system is given a reciprocatory rectilinear movement under the hopper 60, and in this movement drives the receiver which is connected with it. This reciprocation is effected by the rotation of a cranked shaft 68 actuated through the medium of a toothed wheel 69 from the chain 70 by the driving shaft 9. The shaft 68 transmits its movements to the carriage 80 on which are fixed the steel plates 65 and 66, by means of the connecting rods 71, pivoted at 72.

The said valve system is supported by guides 73 of U-form on which it slides by means of rollers 74.

The connection of the screen 62 to the valve system is effected by means of springs 75 which connect the two side walls 76 of the receiver 63 to the partitions 77 fixed to the steel plate 66 by the angle pieces 78. The springs 75 allow the oscillation of the receiver 63 when the latter is subjected to the shocks which are imparted to it by a device 64 comprising a piston 81 adapted to strike against the adjustment wall 76 of the receiver 63. In the steel plate 66 is provided an opening enlarged in the form of a hopper which facilitates the pouring of the material into the receiver 63.

The scraper 77' glides on the upper face of the table 59 and thus relieves it of all material which might have been spread over it.

After leaving the mechanism for the distribution of the aggregate, the tiles are brought into position to be acted on by pressing mechanism and afterwards into line with mechanism for removing the finished tiles and placing them on a carrier which conveys them into the warehouse.

The principal advantages of my invention are as follows:—

(1) It reduces the manual labour required, to a minimum.

(2) It economizes the colour material which is the most expensive and of which, in future, none need be lost, and which will be exactly distributed in the necessary proportions.

(3) It saves time, permitting a very rapid manufacture of titles with incrusted designs.

It is to be observed that the apparatus invented may serve for the manufacture of all kinds of tiles with incrusted designs and that such may be formed of sandstone, of ceramic ware, of cement or of any other analogous materials.

I claim as my invention:

1. An apparatus for the distribution of pulverulent material for machines with a movable table used for the automatic manufacture of tiles with incrusted designs, comprising a fixed hopper containing the material, mechanism for the delivery of a measured quantity of the material, a movable receiver for delivering said material into the mould, and scraping means operated by said receiver.

2. An apparatus for the distribution of pulverulent material for machines with a movable table used for the automatic manufacture of tiles with incrusted designs, comprising a fixed hopper containing the material, mechanism for the delivery of a measured quantity of the material, a movable receiver for delivering said material into the mould, a plate having an opening in which a pattern member is located, on which plate the said movable receiver slides, and means for alternately raising and lowering said plate.

3. In a machine with a movable table used for the automatic manufacture of tiles with incrusted designs, the combination, with a delivery device for pulverulent material, a movable receiver for the material, a pattern member for cooperation with the mould, and a carrier plate for the pattern member, of a single shaft for imparting an intermittent movement to the material delivering device, a to-and-fro movement to the movable receiver, and a raising and lowering movement to the carrier plate.

4. An apparatus for the distribution of pulverulent material for machines with a movable table used for the automatic manufacture of tiles with incrusted designs, comprising a fixed hopper containing the material, mechanism for the delivery of a measured quantity of the material and a movable receiver for delivering said material into the mould, the bottom of said receiver being constituted by a screen through which the pulverulent material passes when the screen is shaken.

5. An apparatus for the distribution of pulverulent material for machines with a movable table used for the automatic manufacture of tiles with incrusting designs, comprising a fixed hopper containing the material, mechanism for the delivery of a measured quantity of the material, a movable receiver for delivering said material into the mould, the bottom of said receiver being constituted by a screen, shaking means associated with the screen, and laterally-disposed supporting springs for the screen to oscillate the same during the shaking operation.

6. An apparatus for the distribution of pulverulent material for machines with a movable table used for the automatic manufacture of tiles with incrusted designs, comprising a fixed hopper containing the material, mechanism for the delivery of a measured quantity of the material, a bottomless, movable receiver for delivering said material into the mould, and a plate having an opening in which a pattern member is located, on which plate the said movable receiver slides, the upper face of said pattern member being disposed in the plane of the plate.

In testimony whereof I affix my signature in presence of two witnesses.

ARTHUR HENROZ.

Witnesses:
 LEONARD LERA,
 MARIE DEFRETTE.